(12) United States Patent
Vander Veen et al.

(10) Patent No.: US 9,497,318 B2
(45) Date of Patent: *Nov. 15, 2016

(54) METHOD AND APPARATUS FOR LINE SELECTION IN A COMMUNICATION DEVICE

(71) Applicant: BlackBerry Limited, Waterloo (CA)

(72) Inventors: Raymond Paul Vander Veen, Waterloo (CA); Neil Patrick Adams, Waterloo (CA); Lawrence Edward Kuhl, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,811

(22) Filed: Dec. 16, 2015

(65) Prior Publication Data

US 2016/0105548 A1   Apr. 14, 2016

Related U.S. Application Data

(63) Continuation of application No. 12/718,070, filed on Mar. 5, 2010, now Pat. No. 9,247,038, which is a continuation of application No. 11/235,509, filed on Sep. 27, 2005, now Pat. No. 7,715,535.

(51) Int. Cl.
*H04M 3/42* (2006.01)
*H04M 1/27* (2006.01)
(Continued)

(52) U.S. Cl.
CPC ......... *H04M 3/42102* (2013.01); *H04M 1/271* (2013.01); *H04M 1/2745* (2013.01); *H04M 1/274566* (2013.01); *H04M 1/57* (2013.01); *H04M 1/7255* (2013.01); *H04M 1/72519* (2013.01); *H04M 1/72563* (2013.01);
(Continued)

(58) Field of Classification Search
CPC ................... H04M 3/436; H04M 3/56; H04M 19/041; H04M 1/57; H04M 3/4281
USPC ......... 379/67.1, 88.23, 93.04, 93.07, 211.01, 379/209.01, 117, 118, 120; 455/461
See application file for complete search history.

(56) References Cited

U.S. PATENT DOCUMENTS 5,367,558 A   11/1994   Gillig et al.
5,526,403 A   6/1996    Tam et al.
(Continued)

FOREIGN PATENT DOCUMENTS

GB   2306078 A   4/1997

OTHER PUBLICATIONS

"Nextel Alternate Line Service FAQs" prior to Feb. 9, 2005.
(Continued)

*Primary Examiner* — MD S Elahee
(74) *Attorney, Agent, or Firm* — Ridout and Maybee LLP (57) ABSTRACT

The present disclosure provide embodiments of an apparatus and method for selecting a line from two or more lines on a communication device. In accordance with one embodiment of the present disclosure, there is provided a method, comprising: detecting initiation of an outgoing call from a communication device to a target party, the communication device having at least two lines; identifying the target party in contact information; determining which of the at least two lines is associated with the target party; in response to the detecting the initiation of the outgoing call, operating the communication device to make the outgoing call to the target party using the associated line.

20 Claims, 9 Drawing Sheets

(51) Int. Cl.
  *H04M 3/436* (2006.01)
  *H04M 1/2745* (2006.01)
  *H04M 1/57* (2006.01)
  *H04M 1/725* (2006.01)
  *H04W 4/12* (2009.01)

(52) U.S. Cl.
  CPC ......... *H04M 1/72583* (2013.01); *H04M 3/436* (2013.01); *H04W 4/12* (2013.01); *H04M 1/274508* (2013.01); *H04M 2250/66* (2013.01); *H04M 2250/74* (2013.01)

(56) References Cited

U.S. PATENT DOCUMENTS

| | | |
|---|---|---|
| 5,937,047 A | 8/1999 | Stabler |
| 6,016,336 A | 1/2000 | Hanson |
| 6,154,660 A | 11/2000 | Singh |
| 6,304,649 B1 | 10/2001 | Lauzon et al. |
| 7,742,590 B2 | 6/2010 | Simpson |
| 2005/0170854 A1 | 8/2005 | Benco et al. |
| 2007/0047695 A1 | 3/2007 | Tal et al. |
| 2014/0269447 A1 | 9/2014 | Brahm et al. |

OTHER PUBLICATIONS

Hyam, Kristy—Canadian Intellectual Property Office, "Examiner's Report" for corresponding Canadian Patent Application No. 2,560,607 dated Jun. 11, 2009, Canada.

Banerjea, R—European Patent Office, "Extended European Search Report" for corresponding European Patent Application No. 05108982.9 dated Dec. 20, 2005, Germany.

Banerjea, R—European Patent Office, "Communication Pursuant to Article 96(2) EPC" for corresponding European Patent Application No. 05108982.9 dated Sep. 20, 2007, Germany.

METHOD AND APPARATUS FOR LINE SELECTION IN A COMMUNICATION DEVICE

CROSS-REFERENCE TO RELATED APPLICATIONS

The present application is a continuation of U.S. patent application Ser. No. 12/718,070, filed Mar. 5, 2010, which is a continuation of U.S. patent application Ser. No. 11/235,509, filed Sep. 27, 2005, the contents of both of these applications being incorporated herein by reference.

TECHNICAL FIELD

The present application relates to communications devices.

BACKGROUND

Communications devices with the ability to consolidate multiple functions into a single device are becoming increasingly popular. For example, such a communications device may be used as a telephone and for email. In addition, it is common for an individual to use such a communications device for many aspects of their lives such as work and personal use.

A user may wish to use a different phone line when making calls to different parties. For example, when calling a work colleague, a user may wish to use a line dedicated for work use so that, when the work colleague receives the call on their communications device, the user's work phone number is identified. Likewise, when calling a friend, the user may wish to use a line for personal use so that, when the friend receives the call on their communications device, the user's personal phone number is identified. The use of multiple lines may also be useful for tracking long distance bills and other billing matters.

Systems for selecting alternate lines exist and are commonly known as "Alternate Line Service" (ALS). In one known system, when a user wishes to make a call on an alternate line, they must open a menu and manually select the alternate line. Due to the added operating steps and time it would take to configure the call, it is not convenient to use an alternate line. In addition, the user may accidentally make a call on the wrong line by forgetting to select an alternate line or by selecting the wrong line.

Accordingly, there remains a need in the art for new and improved mechanisms for selecting a line in a communication device.

BRIEF DESCRIPTION OF THE DRAWINGS

Reference will now be made to the accompany drawings, which show by way of example, embodiments of the present disclosure, and in which.

In the drawings, like elements are indicated by like references.

DETAILED DESCRIPTION OF THE EMBODIMENTS

In accordance with one embodiment of the present disclosure, there is provided a method, comprising: detecting initiation of an outgoing call from a communication device to a target party, the communication device having at least two lines; identifying the target party in contact information; determining which of the at least two lines is associated with the target party; in response to the detecting the initiation of the outgoing call, operating the communication device to make the outgoing call to the target party using the associated line.

In accordance with another embodiment of the present disclosure, there is provided a communication device, comprising: a communication subsystem configured to communicate with a target party over a network on one of at least two lines; a processor coupled to the communication subsystem, wherein the processor is configured to: detect initiation of an outgoing call from a communication device to a target party, the communication device having at least two lines; identify the target party in contact information; determine which of the at least two lines is associated with the target party; in response to the detecting the initiation of the outgoing call, operate the communication device to make the outgoing call to the target party using the associated line.

In accordance with a further embodiment of the present disclosure, there is provided a non-transitory machine readable medium containing machine-executable instructions that, when performed by a processor of a communication device having at least two lines, cause the processor to: detect initiation of an outgoing call from a communication device to a target party, the communication device having at least two lines; identify the target party in contact information; determine which of the at least two lines is associated with the target party; in response to the detecting the initiation of the outgoing call, operate the communication device to make the outgoing call to the target party using the associated line.

In accordance with a further embodiment of the present disclosure, there is provided a method for selecting a line from at least two lines on a device having a display, an input module, a line selection module, a communication module for making a call over a network to a target recipient, the method comprising: storing line selection information; monitoring the input module for initiation of a call to the target recipient; upon detecting the initiation of the call, selecting a line from the at least two lines in the line selection module, the selected line being dependent on the line selection information; and making the call to the target recipient on the selected line.

In accordance with a further embodiment of the present disclosure, there is provided a device for communicating over a network, the device comprises: an input module, the input module is responsive to initiation of a call; a communication module for communicating with a target recipient over the network on one of at least two lines; a storage module for storing line information; and a line selection module for selecting one of the at least two lines for communicating with the target recipient, the line selection module being responsive to the line information.

In accordance with a further embodiment of the present disclosure, there is provided a computer program product having a computer-readable medium tangibly embodying computer executable code for selecting a line on a device having at least two lines and including a line selection module, a display, an input module, a communication module for making a call to a target recipient over a network, the executable code comprises; instructions for storing line selection information; instructions for monitoring for the input module for initiation of a call to the target recipient; instructions for, upon detecting initiation of the, retrieving from the line selection module a line selected from the at least two lines in dependence upon the line selection information; and instructions for making the call to the target recipient on the selected line.

Figure 1:
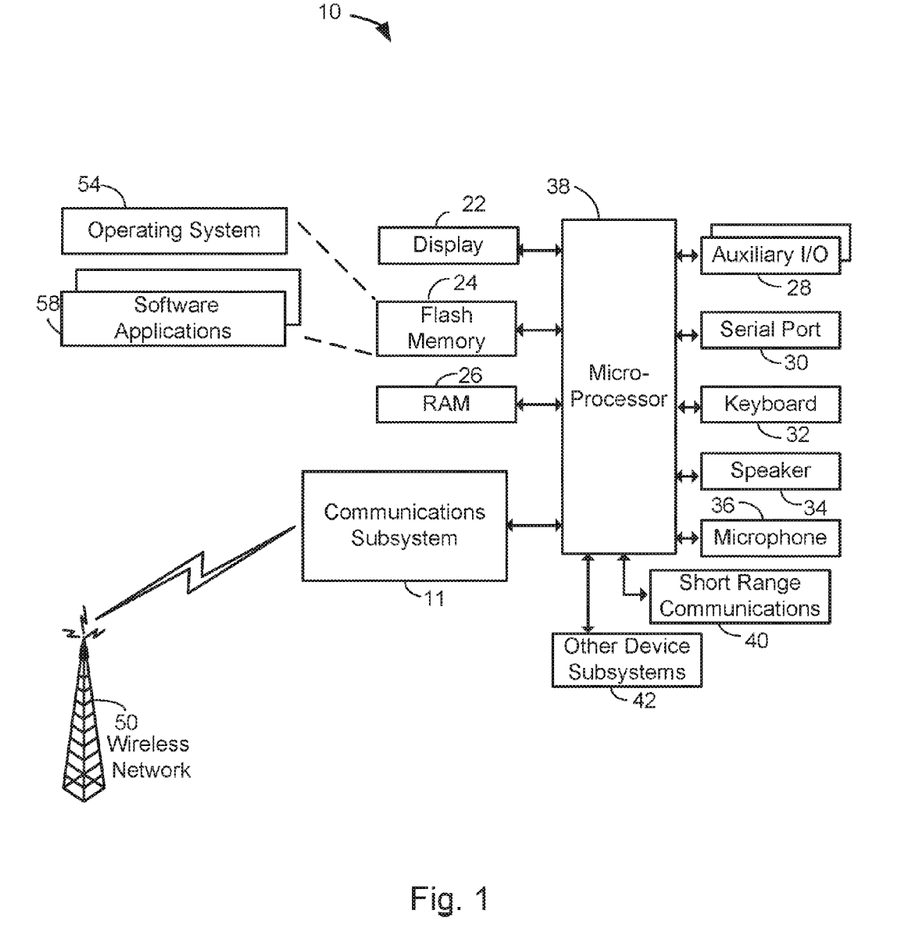
FIG. 1 shows in block diagram form a mobile communications device incorporating a line selection mechanism in accordance with an embodiment of the present disclosure.

Referring now to the drawings, FIG. 1 is a block diagram showing an example of an electronic communications device 10 suitable for use with a line selection mechanism in accordance with an embodiment of the present disclosure. The communication device 10 as shown comprises a two-way mobile communication device having voice and messaging communications capabilities. The electronic communication device 10 may take various forms or implementations such as a data communication device, a multiple-mode communication device configured for both data and voice communication, a mobile telephone, a PDA enabled for wireless communication, a computer system with a wireless modem or wireless network card, or a computer or phone device with a fixed connection to a network. The device 10 may also be implemented as a handheld or portable device.

As shown in FIG. 1, the communication device 10 includes a communication subsystem 11. The communication subsystem 11 may include a receiver (not shown), a transmitter (not shown), and associated components such as an antenna element (not shown), and a controller such as a digital signal processor (DSP). As will be apparent to those skilled in the art, the particular design of the communication subsystem 11 will depend on the communication network(s) in which the device 10 is intended to operate.

Signals received by the communication device 10 from a wireless communication network 50 are input to the receiver (not shown) of the communication subsystem 11, which may perform such common receiver functions as signal amplification, frequency-down conversion, filtering, channel selection and the like. In a similar manner, signals to be transmitted are processed by the DSP, for example, modulation and encoding and input to the transmitter for digital-to-analog conversion, frequency-up conversion, filtering, amplification and transmission over the wireless communication network 50.

Figure 2:
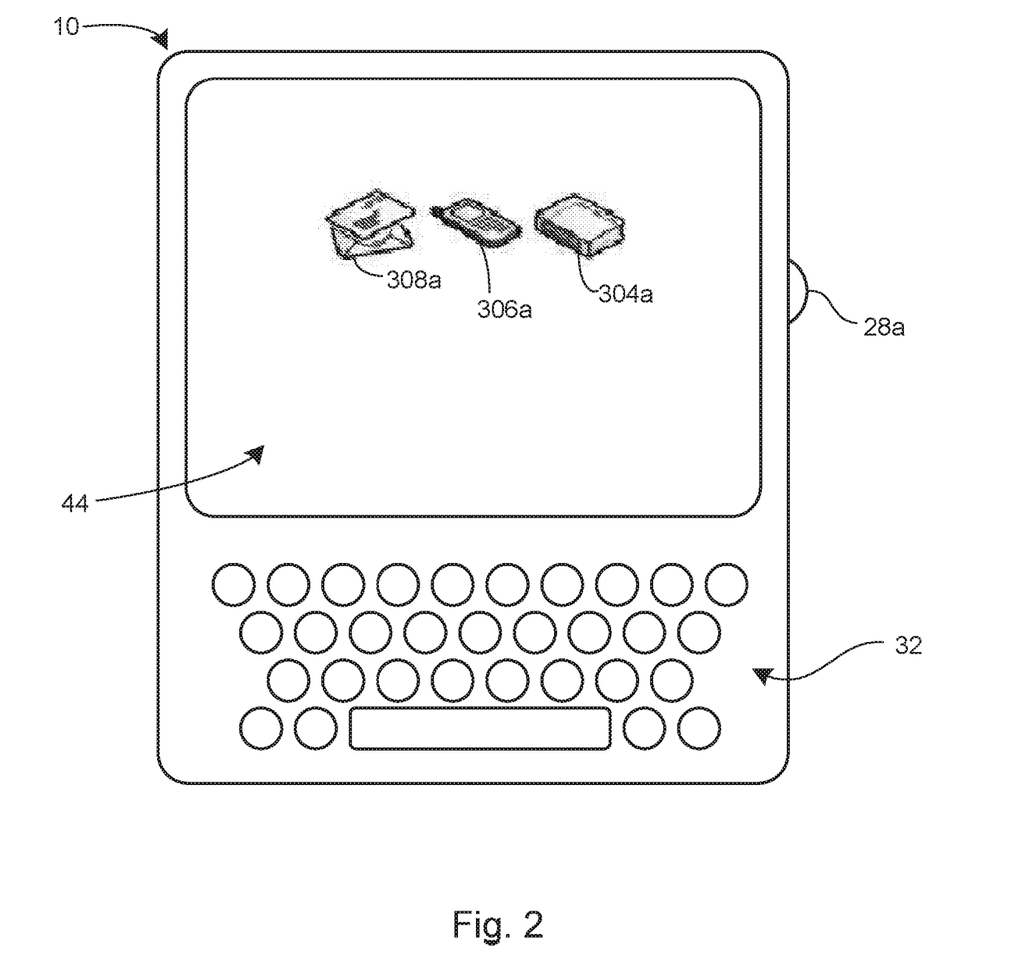
FIG. 2 shows, in diagrammatic form, a front view of an exemplary implementation of the mobile communications device of FIG. 1.

The communication device 10 includes a microprocessor or microcontroller device 38. The microprocessor operates under stored program control (e.g. firmware) and is suitably programmed to control the overall operation of the communication device 10 and other functions as described below. The microprocessor 38 interacts with the communications subsystem 11 and also interacts with further device subsystems such as a display module 22, a flash memory 24, a random access memory (RAM) 26, one or more auxiliary input/output (I/O) subsystems or devices 28 (e.g. a thumbwheel 28a as shown in FIG. 2), a serial port 30, an input device e.g. a keyboard or keypad 32, a speaker 34, a microphone 36, a short-range communications subsystem 40, and other device subsystems or modules which are generally designated by reference 42.

Referring back to FIG. 1, the microprocessor 38, in addition to its operating system functions, preferably enables execution of the software applications 58 on the device. The software applications 58 control basic device operations, including data and voice communication applications for example, and are normally installed (e.g. "burned") in the device 10 as firmware during manufacture. Further software applications may also be loaded onto the device 10 through the wireless communication network 50, an auxiliary I/O subsystem or module 28, serial port 30, short-range communications subsystem 40 or any other suitable subsystem 42, and installed by a user (or automatically) in the RAM 26 or a non-volatile memory device for execution by the microprocessor 38. Such flexibility in application installation increases the functionality of the device 10 and may provide enhanced on-device functions, communication-related functions, or both. For example, secure communication applications may enable electronic commerce functions and other such financial transactions to be performed using the device 10.

In data communication mode, a received signal such as a text message or web page download is processed by the communication subsystem 11 and input to the microprocessor 38, which may further process the received signal for output to the display 22 through a graphics module, for example in the subsystem 42, or alternatively to an auxiliary I/O device 28. A user of the communication device 10 may also compose data items within a software application 58, such as email messages and phone numbers for example, using the keyboard 32 in conjunction with the display 22 and for the auxiliary I/O device 28 (e.g. the thumbwheel 28a). Such composed items are then transmitted and received over a communication network (e.g. the wireless network 50) through the communication subsystem 11.

The serial port 30 (which may be for example a universal serial bus (USB) port) in FIG. 1 allows a user to set preferences through an external device or software application. This extends the capabilities of the device 10 by providing for information or software downloads to the device 10 other than through the wireless communication network 50.

The short-range communication subsystem 40 provides for communication between the device 10 and different systems or devices, which need not necessarily be similar devices. For example, the short-range communication subsystem 40 may comprise an infrared device and associated circuits and components, or a Bluetooth™ communication module, to provide for communication with similarly enabled systems and devices.

The wireless communication network 50 may comprise a wireless wide area packet data network, (e.g. Mobitex™ or DataTAC™), which provides radio coverage to mobile implementations of the device 10. The wireless communication network 50 may comprise a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In another implementation or embodiment, the wireless communication network 50 comprises a wireless local area network (WLAN), such as a network according to one of the IEEE 802.11 family of standards. In another implementation or embodiment, the communication device 10 is configured to communicate in both data and voice modes over both wireless WAN and WLAN networks and to roam between such networks.

Reference is next made to FIG. 2 which shows, in diagrammatic form, a front view of the communication device 10 implemented as a handheld unit and indicated generally by reference 20. The handheld device 20 includes a display screen or display module 44, an alphanumeric keyboard or keypad 32 and the thumbwheel 28a.

Referring back to FIG. 1, the stored program control includes operating system software 54 and the other software applications or functions 58 used by the microprocessor 38. The program (i.e. firmware) is stored in a persistent (i.e. non-volatile) device such as flash memory 24 or similar storage device. Those skilled in the art will appreciate that the operating system 54, the software applications 58, or parts thereof, may be temporarily loaded into a volatile store such as RAM 26. It is contemplated that received communication signals may also be stored to RAM 26.

Figure 3:
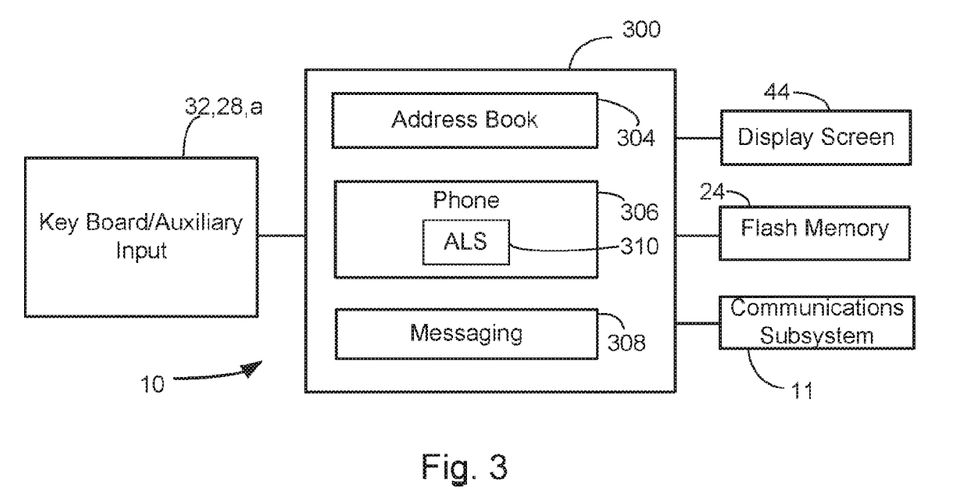
FIG. 3 shows in block diagram form further aspects of the mobile communications device of FIG. 1.

Reference is next made to FIG. 3, which depicts the software application 58 resident (i.e. loaded or stored) on the device 10 and implemented as functional components or modules 300. The functional components or modules 300 interact and control the device subsystems described above, and include an address book module 304, a communication module 306, and an email and/or instant text messaging module 308. Although the communication module 306 is described as phone communication module, it will be appreciated that in other embodiments the communication module may comprise a data communication device or voice/data communication device. The features/operations associated with the functional modules 300 may be implemented through firmware or hardware components, or a combination of hardware and firmware executed by the microprocessor 38.

The address book module 304 provides the functionality to store and access contact information, such as telephone numbers and email and/or instant text messaging addresses, as well as information such as a contact's name, company name, address, notes about the contact and contact category (e.g. work, personal, etc). The phone module 306 allows the device 10 to operate as a voice phone (or a video phone in another implementation) over the wireless network 50 and/ or other networks. The messaging module 308 provides the communication device 10 with the capability to send and receive electronic messages such as email and/or text messages over the wireless network 50 and/or other networks.

As shown in FIG. 2, the functional modules 300 may each have an associated selectable icon that is displayed on the screen 44 as part of a graphical user interface. As shown, the address book module 304 includes an icon 304a. The phone module 306 includes an icon or indicator 306a and the electronic messaging module 308 includes an icon 308a or graphical indicator.

In the presently described embodiment, the phone module 306 is configured with at least a first line and a second line for transmitting and receiving phone calls. Accordingly, the communication device 10 will have at least a first and a second phone number corresponding to the first line and to the second line respectively. For example, a user may use the first line and corresponding first phone number for work use and the second line and corresponding second phone number for personal use.

As shown in FIG. 3, the communication device 10 comprises a line selection module 310 for selecting which line should be used by the phone module 306. The line selection module 310 selects the line to be used by the phone module 306 based upon line selection information stored on the device 10 for example, a record of which line is a default line. When the user initiates a phone call, the microprocessor 38 under program control determines the selected line for the line selection module 310 and passes it on to the phone module 306. It should be noted that the line selection module 310 may be implemented as a component or function of the phone module 306. The line selection module 310 may also be implemented as part of any other module, for example, the address book module 304.

According to one implementation, when a user makes a phone call, the line selection module 310 selects a default line. This default line may be selected by the user, for example by way of a line selection user interface screen as will be described in more detail below. The default line may be the first line, the second line or any other line.

The line that is used for a call to a particular target recipient may be recorded by the microprocessor 38 in association with that target recipient so that the next time a call is made to that target recipient, the line selection module 310 selects the recorded line. It should be noted that the term "target recipient" is referred to herein as the phone number, person, company or the like to whom/which an outgoing call is made. The term "target recipient" may also be taken to mean one or more persons, companies or the like.

According to another embodiment, target recipients stored as entries in the address book of the address book module 304 are associated with a particular line. When the user places a call to a particular target recipient, the line selection module 310 selects the line associated with that particular target recipient.

Figure 4A:
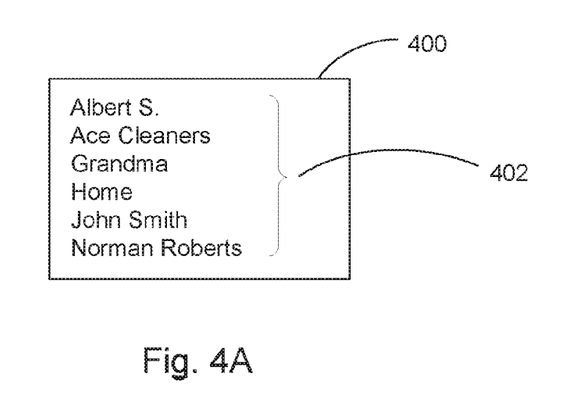
FIG. 4A shows in diagrammatic form an example of a graphical user interface screen for an address book for the device.

Reference is made to FIG. 4A which shows, in diagrammatic form, a graphical user interface screen (i.e. display screen) for an address book list 400. The address book list screen 400 may be generated in response to the user selecting the address book icon 304a (FIG. 2) for example using the thumbwheel 28a (FIG. 2). The address book list screen 400 includes a list of target recipients denoted by reference 402. The address book entry screen 400 may also be generated in response to the user selecting the phone module icon 306a (FIG. 2) and subsequent selection of a menu item.

Figure 4B:
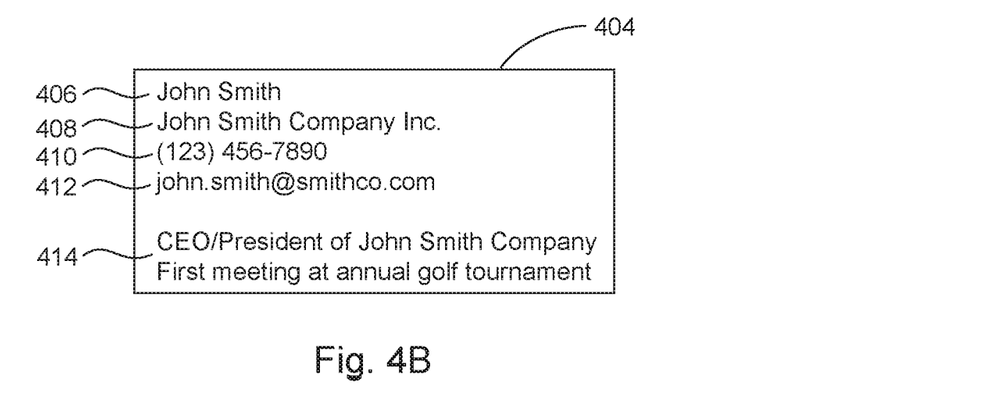
FIG. 4B shows in diagrammatic form an address book entry for the graphical user interface screen.

Selection of a particular target recipient from the list of target recipients 402, via the keyboard 32 and/or an auxiliary input device 28 such as thumbwheel 28a, generates an address book entry graphical user interface or display screen 404, as shown in FIG. 4B. As shown the address book entry display screen 404 includes one or more of the following: a name 406 for the target recipient (e.g. John Smith), a company name 408 with which the target recipient is associated (e.g. John Smith Company), a phone number 410 for the target recipient phone number (e.g. (123) 456-7890), an email address 412 associated with the target recipient (e.g. john.smith@smithco.com) and notes 414 associated with the target recipient.

Figure 4C:
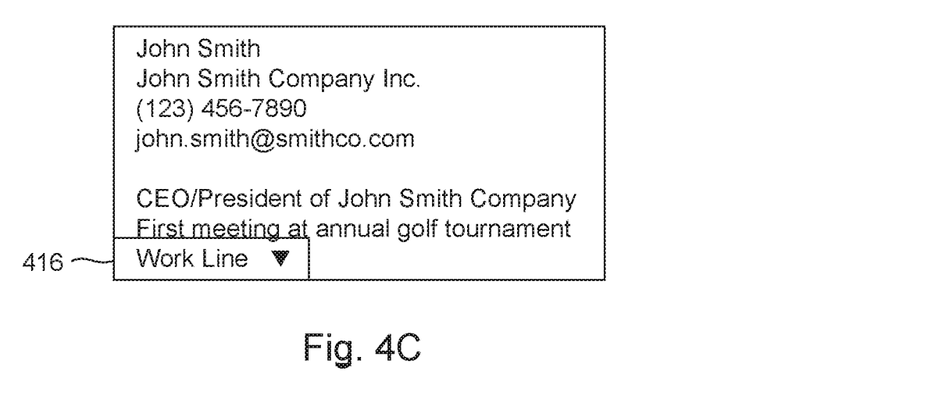
FIG. 4C shows a further view of the address book entry on the graphical user interface screen.

According to another embodiment, the address book entry screen 404 includes a user selectable line selection field 416, as shown in FIG. 4C. For example, the user selects "work line" from a drop-down list or a menu. The line selection module 310 selects the line displayed in the line selection field 416 when the user places a call to the target recipient with which the address book entry is associated.

Figure 4D:
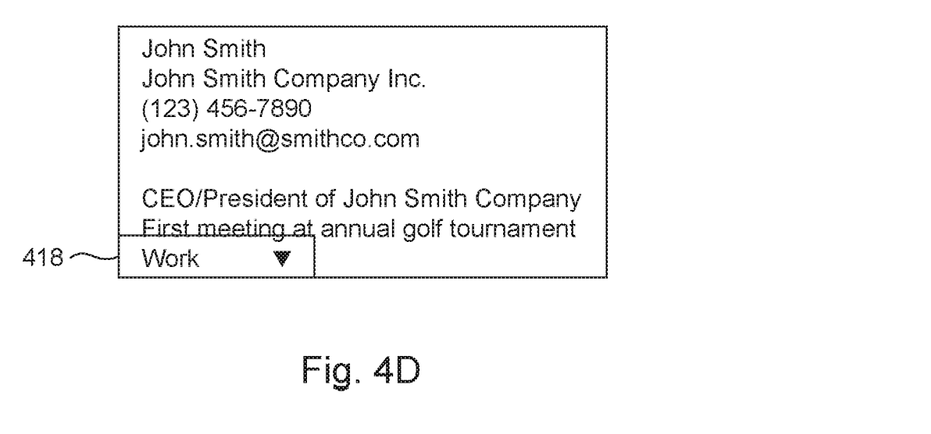
FIG. 4D shows a further view of the address book entry for the graphical user interface screen.

As shown in FIG. 4D, the address book entry screen 404 includes a category field 418. For example, if the user selects the category "work", the line selection module 310 (automatically) selects the line associated with work use, for example, the first line. In another example, if the user enters the category "friend", the line selection module 310 selects the line associated with personal use, for example, the second line.

According to another embodiment, the line selection module 310 selects a first line during a first time period and a second line during a second time period. For example, a user may wish to automatically use a first line during work hours and a second line after work hours and on weekends.

Figure 5A:
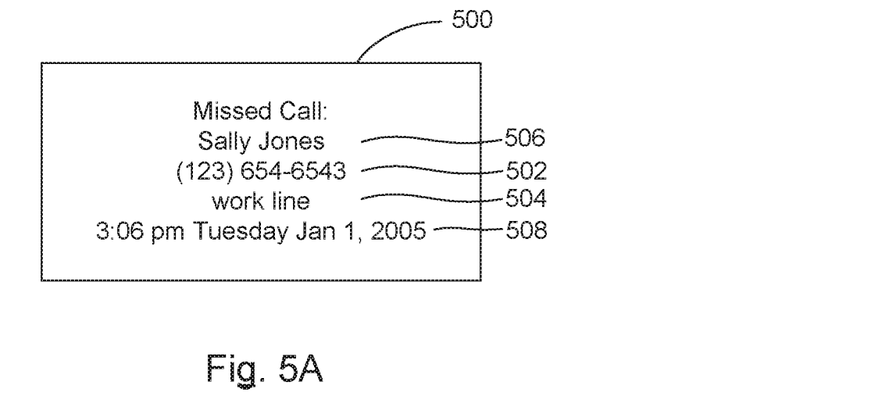
FIG. 5A shows a screen display for a missed call indicator.

According to another embodiment, when a user misses an incoming call to the device 10 and the caller does not leave a voice mail, a missed call indicator or icon 500 is displayed on screen 44 (FIG. 2), as shown in FIG. 5A. The missed call indicator 500 may be displayed on the screen 44 (FIG. 2) following a user prompt using an auxiliary I/O device 28 (FIG. 1), for example, the thumbwheel 28a (FIG. 2), or the keyboard 32 (FIG. 2). It should be noted that there may be more than one missed call indicator, for example a primary indicator such as a missed call icon or an item in a list of recent activity (i.e. a call log) and a secondary indicator similar to the missed call indicator 500 which is displayed on the screen 44 (FIG. 2) following a user prompt, as discussed above.

The missed call indicator 500 may include the phone number of the missed call 502 (e.g. (123) 987-6543). The missed call indicator 500 may also display the line 504 on which the call was made (e.g. "work line"). If the phone number of the missed call 502 corresponds to the phone number of a target recipient stored in the address book module 304 (FIG. 3), the missed call indicator 500 may display the name 506 (e.g. Sally Jones) or any other information associated with target recipient to which the phone number corresponds. The missed call indicator 500 may also display the time and date of the missed call 508.

Figure 5B:
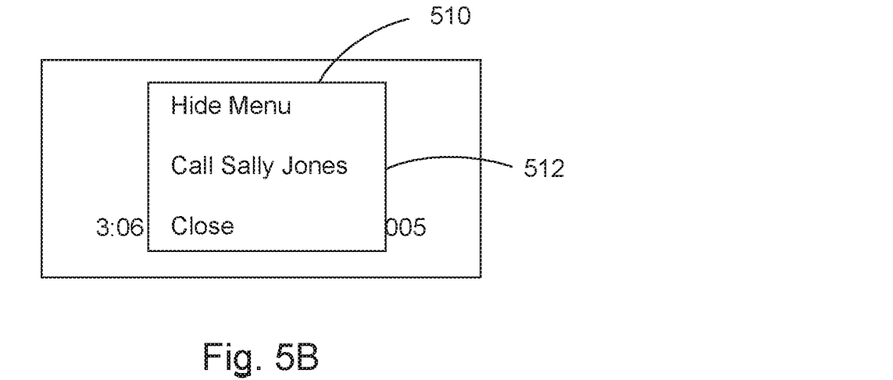
FIG. 5B shows a screen display for a menu associated with the missed call indicator of FIG. 5A.
Figure 5C:
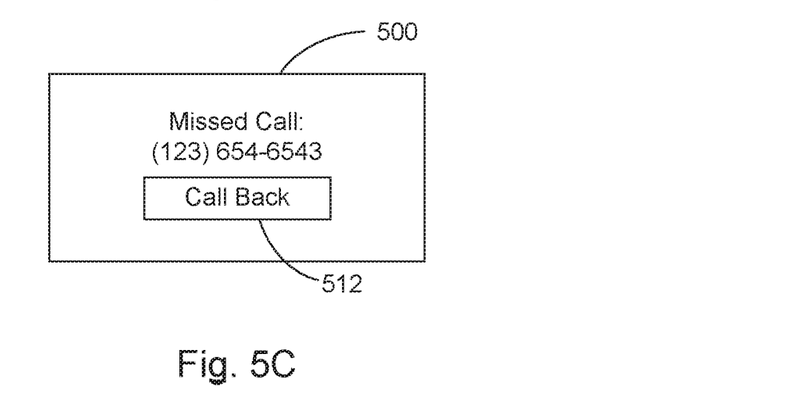
FIG. 5C shows a screen display for another form of the missed call indicator.

The user can prompt the device 10 to display to an additional menu 510, as shown in FIG. 5B via the keyboard and/or an auxiliary input device such as thumbwheel 28a. The additional menu 510 comprises a plurality of selectable items, including an item 512 for calling the target recipient, e.g. "Call Sally Jones". If the user selects the item 512, the phone module places a call to the target recipient. The line selection module 310 (FIG. 3) selects the line associated with the target recipient in the address book module 304 (FIG. 3), as described above. Alternatively, the line selection module 310 (FIG. 3) selects the same line that was used the last time a call was placed to that target recipient, as stored on the device 10 by the microprocessor 38 (FIG. 1). Alternatively, the line selection module 310 selects the line on which the missed call was received.

Figure 6A:
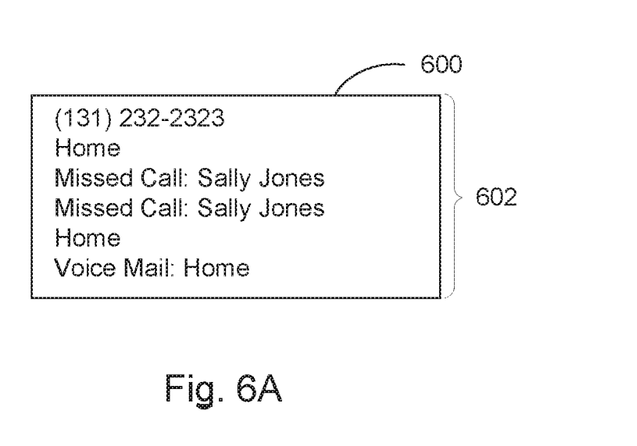
FIG. 6A shows a screen display for a call log.

According to another embodiment, the phone module 306 (FIG. 3) comprises a call log displayed on screen 44 (FIG. 2) as a call log user interface 600 having a list 602 of recently called target recipients and/or received calls, missed calls and voice mails as shown in FIG. 6A. It will be appreciated that the (primary) missed call indicator mentioned previously may be displayed as an item of the list 602.

Figure 6B:
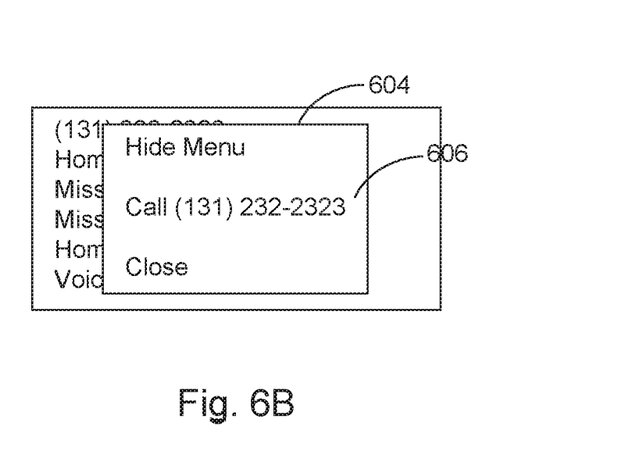
FIG. 6B shows a screen display with a menu associated with the call log.

The user places a call to a particular target recipient of the list 602 by selecting the target recipient using the auxiliary I/O device 28 (FIG. 1), for example, the thumbwheel 28a (FIG. 2), or the keyboard 32 (FIG. 2) in conjunction with the display 22. Selection of the target recipient prompts the display of a menu 604, as shown in FIG. 6B, via the keyboard 32 and/or an auxiliary input device 28 such as thumbwheel 28a. The menu 604 comprises a plurality of selectable items, including an item 606 for placing a call to the particular target recipient, e.g. "Call (131) 232-2323". The line selection module 310 (FIG. 3) selects the same line that was used the last time a call was placed to that target recipient, as stored on the device 10 by the microprocessor 38. Alternatively, the line selection module 310 (FIG. 3) selects the line associated with the target recipient in the address book module 304 (FIG. 3), as described above.

Figure 7A:
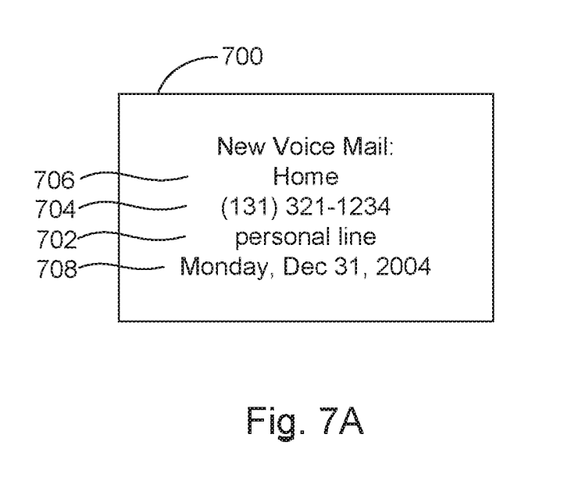
FIG. 7A shows a screen display on the graphical user interface for a new voice mail indicator.

In another embodiment, the phone module 306 (FIG. 3) comprises a voice mail system. When a new voice mail message is stored by the phone module 306, the device 10 displays a voice mail waiting indicator 700 on screen 44, as shown in FIG. 7A. The voice mail indicator 700 may be displayed on the screen 44 (FIG. 2) following a user prompt using an auxiliary I/O device 28 (FIG. 1), for example, the thumbwheel 28a (FIG. 2), or the keyboard 32 (FIG. 2). It will be appreciated that there may be more than one voice mail indicator, for example, a primary indicator such as a voice mail icon or an item in a list of recent activity (e.g. a call log) and a secondary indicator similar to the voice mail waiting indicator 700 which is displayed on the display 22 (FIG. 2) following a user prompt, as discussed above.

The voice mail waiting indicator 700 may display the line 702 on which the call was made (e.g. "personal line") and a phone number 704 of the target recipient that left the voice mail (e.g. "(123) 987-6543"). If the phone number 704 corresponds to the phone number of a target recipient stored in the address book module 304 (FIG. 3), the voice mail indicator 700 may also display a name 706 or any other information of the target recipient that left the voice mail (e.g. "Home"). The voice mail indicator 700 may also display a time and date 708 for the voice mail message.

Figure 7B:
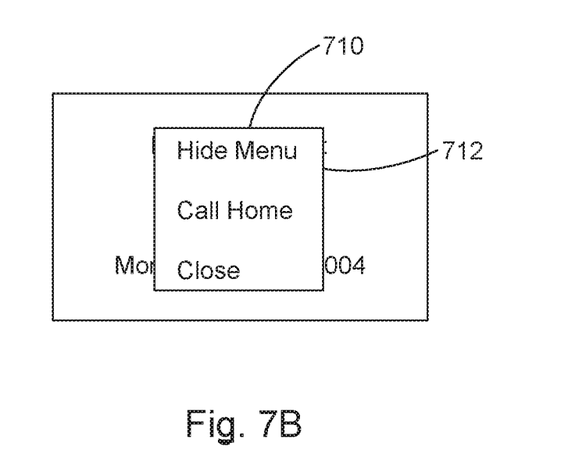
FIG. 7B shows a screen display for a menu associated with a new voice mail indicator of FIG. 7A.

The user may prompt the display of an additional menu 710, as shown in FIG. 7B via the keyboard and/or an auxiliary input device such as thumbwheel 28a (FIG. 2). The menu 710 comprises a plurality of selectable items, including an item 712 for calling the number of the target recipient that left the voice mail, e.g. "Call Home". The line selection module 310 (FIG. 3) selects the line 702 (FIG. 7A) indicated in the voice mail waiting indicator 700. Alternatively, the line selection module 310 (FIG. 3) selects the same line that was used the last time a call was placed to that target recipient, as stored on the device 10 by the microprocessor 38. Alternatively, the line selection module 310 (FIG. 3) selects the line associated with the target recipient in the address book module 304 (FIG. 3), as described above.

Figure 8A:
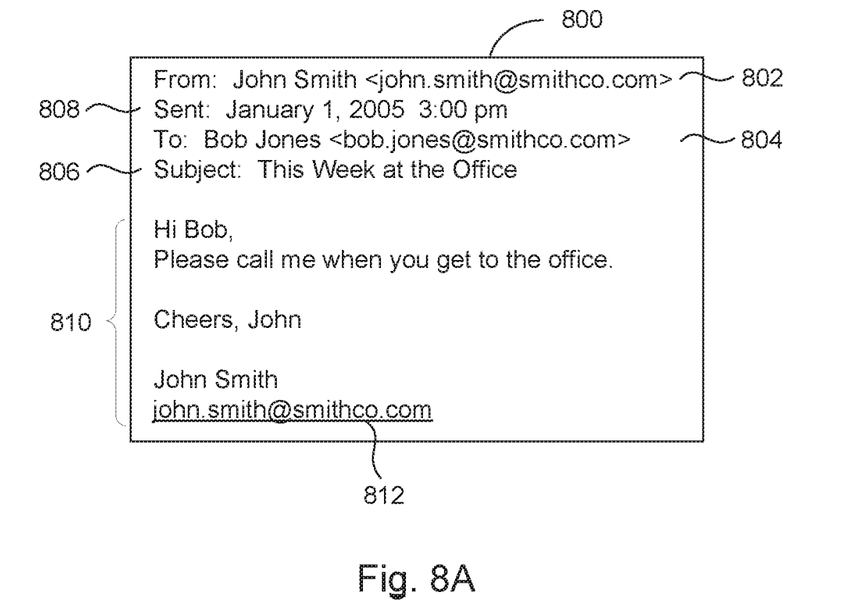
FIG. 8A shows a diagrammatic view of an electronic mail message graphical user interface screen.

According to another embodiment, the messaging module 308 (FIG. 3) includes email functionality. When an email message is opened, the screen 44 (FIG. 2) displays an email message graphical user interface screen 800, as shown in FIG. 8A. The email message screen 800 is generated in response to the user selecting an email message or in response to other activity at device 10. It will be appreciated that the email message screen 800 may be replaced by a screen display for an SMS message or any other type of electronic message, for example, as described above.

Figure 8B:
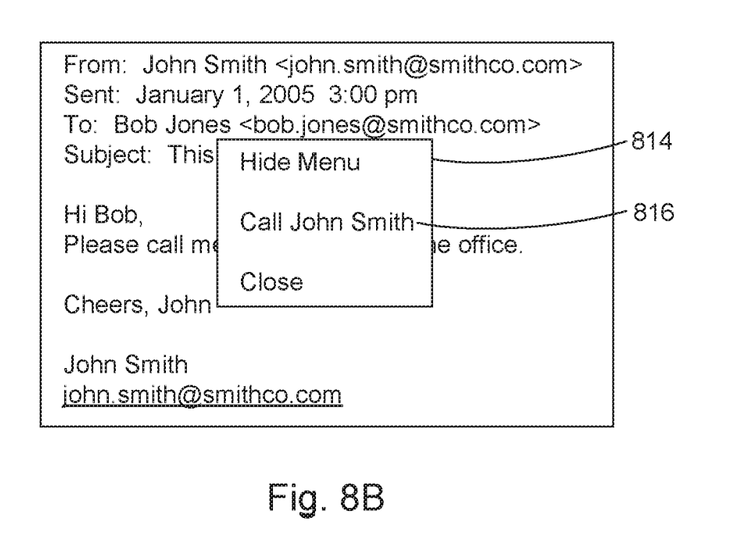
FIG. 8B shows a diagrammatic view of a menu associated with an electronic mail message.

As shown in FIG. 8A, the email message screen 800 includes a sender name 802, a list of recipients 804, a subject of the message 806, a date and/or time the message was sent 808 and a message body 810. The message body 810 may include an email hyperlink 812. The user may prompt the device 10 display to a menu 814, as shown in FIG. 8B, via the keyboard and/or an auxiliary input device such as thumbwheel 28a (FIG. 2) by selecting the email hyperlink 812. The menu 814 comprises a plurality of selectable items, including an item 816 for calling the target recipient associated with the email hyperlink 812. Selection of the item 816 will prompt the phone module 306 to place a call to the target recipient associated with the email hyperlink 814. The line selection module 310 (FIG. 3) selects the line associated with the target recipient in the address book module 304. Alternatively, the line selection module 310 (FIG. 3) selects the same line that was used the last time a call was placed to that target recipient, as stored on the device 10 by the microprocessor 38.

According to one embodiment, selection of the item 816 prompts the phone module 306 (FIG. 3) to place a call to the target recipient associated with the email author or sender 802. The line selection module 310 (FIG. 3) selects the line associated with the email author or sender 802 in the address book module 304 (FIG. 3). Alternatively, the line selection module 310 selects to use the same line that was used the last time a call was placed to that target recipient, as stored on the device 10 by the microprocessor 38.

Figure 9A:
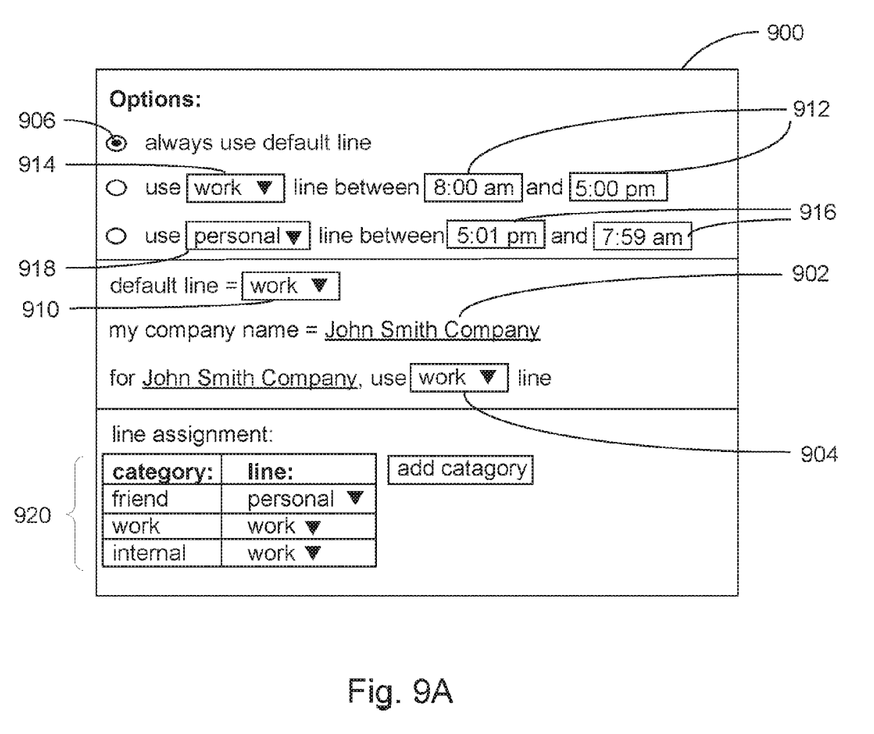
FIG. 9A shows a diagrammatic view of line selection setup graphical user interface screen.

According to another embodiment, the user prompts the device 10 to display a line selection setup user interface screen 900 as shown in FIG. 9A. The line selection setup screen 900 may be displayed in response to a line selection icon (not shown). The line selection setup user interface screen 900 may also be prompted via a user selectable item in a phone module user interface screen (not shown). Through the line selection setup screen 900, the user activates or deactivates various line selection configurations and enters various information.

The user may enter a company name (e.g. John Smith Company) in a field 902 in the line selection setup screen 900. The company name 902 may be stored in association with a user-selectable line 904 (e.g. a work line) so that whenever a phone call is made to the target recipient associated with that company, the line selection module 310 (FIG. 3) selects that selected line 904 This company name 902 may be the user's own company name.

The line selection setup screen 900 may comprise a number of user-selectable items, such as an item 906 for selecting an option to always use a particular line, such as a default line 908. The line selection setup screen 900 may also include an optional function 910 for selecting which line to use as the default line.

The line selection setup screen 900 may also comprise an optional function for selecting a first time period 912 during which to select a first line 914 and a second time period 916 during which to select a second line 918 as described above.

The line selection setup screen 900 may include setup options or functions 920 for assigning alternate lines to certain categories or line selection fields, as described above with reference to FIG. 4D for example.

Figure 9B:
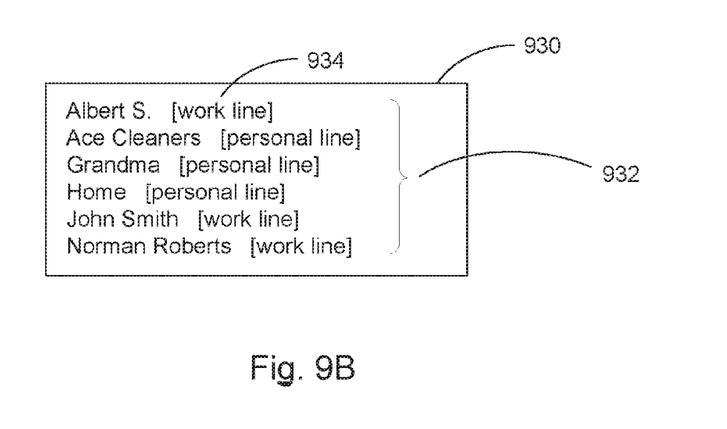
FIG. 9B shows a diagrammatic view of a phone module graphical user interface screen.

According to another embodiment, the user prompts the device to display a user interface screen 930, as shown in FIG. 9B, that is similar to the graphical user interface screen for the address book list 400. This user interface screen 930 comprises a list 932 of target recipients. Each of the target recipients 932 includes a line selection indicator 934 that indicates which outgoing line will be selected by the line selection module 310 (FIG. 3) as described above with respect to other embodiments. The user may elect to change the selected line indicated by the line selection indicator 934 using suitable means for line selection, such as the line selection field 416 described previously.

It should be noted that while in the above description, a number of example embodiments have been described independently, these embodiments may also be combined. For example, if a call is placed to a target recipient associated with a particular address book entry, the line selection module 310 (FIG. 3) selects the line associated with that particular address book entry. If the target recipient is not associated with an address book entry, the line selection module 310 selects the line associated with the period of the day during which the call is placed.

It should also be understood that while in the above description, the entering of information, selection of items, and the like is performed using the device 10, it is equally possibly these tasks be performed using a computer, for example a desktop computer, in communication with the device 10.

It is to be appreciated that the foregoing embodiments are exemplary and do not limit the implementation of the present disclosure to any particular computer programming language, operating system, system architecture or device architecture. Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions, and other devices.

Furthermore, the present disclosure may be embodied in other specific forms without departing from the spirit or essential characteristics thereof. Certain adaptations and modifications of the present disclosure will be obvious to those skilled in the art. Therefore, the presently discussed embodiments are considered to be illustrative and not restrictive, the scope of the present disclosure being indicated by the appended claims rather the foregoing description, and all changes which come within the meaning and range of equivalency of the claims are therefore intended to be embraced therein.

The invention claimed is:

1. A method performed by a processor of a communication device, comprising:
    detecting input to initiate an outgoing call from the communication device to a target party, the communication device having at least two lines;
    in response to detecting input to initiate the outgoing call, identifying the target party in contact information stored on the communication device;
    determining which of the at least two lines is associated with the target party based upon information in the target party's contact information and line selection information stored on the communication device; and
    operating the communication device to make the outgoing call to the target party using the associated line determined by the processor.

2. The method of claim 1, wherein the determining which of the at least two lines is associated with the target party is based on a preference including an association between a particular one of the at least two lines and the target party, the preference identifying a line on which an incoming call from the target party was detected.

3. The method of claim 1, further comprising:
before detecting initiation of an outgoing call from a communication device to a target party, associating a particular one of the at least two lines with the target party in response to the receipt of an incoming call from the target party on the particular one of the at least two lines,
wherein the determining which of the at least two lines is associated with the target party is based on a preference including the association between the particular one of the at least two lines and the target party, the preference identifying a line on which the incoming call from the target party was detected.

4. The method of claim 1, wherein the contact information is stored in a memory of the communication device.

5. The method of claim 1, further comprising:
storing, in a call log, a record of a previous outgoing call to the target party.

6. The method of claim 5, wherein the detecting the initiation of the outgoing call comprises:
detecting selection of a reference to the record of the previous outgoing call in the call log; and
detecting selection of a menu item associated with initiating the outgoing call to the target party referenced by the record of the previous outgoing call.

7. The method of claim 2, wherein the incoming call comprises a missed incoming call on the particular one of the at least two lines from the target party.

8. The method of claim 7, further comprising:
storing, in a call log, a record of the missed incoming call from the target party.

9. The method of claim 8, wherein the detecting the initiation of the outgoing call comprises:
detecting selection of a reference to the record of the missed incoming call from the call log; and
detecting selection of a menu item associated with initiating the outgoing call to the target party referenced by the record of the missed incoming call.

10. The method of claim 7, further comprising:
storing a voice mail message following the missed incoming call received on the particular one of the at least two lines from the target party.

11. The method of claim 10, wherein the detecting the initiation of the outgoing call comprises:
controlling display of a voice mail waiting indicator;
responsive to receipt of input, controlling display of a menu associated with the voice mail waiting indicator; and
detecting selection of a menu item in the menu, the menu item associated with initiating the outgoing call to the target party referenced by the voice mail waiting indicator.

12. The method of claim 1, wherein the outgoing call is a voice call.

13. The method of claim 1, wherein the outgoing call is a video call.

14. A communication device, comprising:
a communication subsystem configured to communicate with a target party over a network on one of at least two lines;
a processor coupled to the communication subsystem, wherein the processor is configured to:
detect input to initiate an outgoing call from a communication device to a target party, the communication device having at least two lines;
in response to detection of input to initiate the outgoing call,
identify the target party in contact information stored on the communication device;
determine which of the at least two lines is associated with the target party based upon information in the target party's contact information and line selection information stored on the communication device; and
operate the communication device to make the outgoing call to the target party using the associated line determined by the processor.

15. The communication device of claim 14, wherein the determining which of the at least two lines is associated with the target party is based on a preference including an association between a particular one of the at least two lines and the target party, the preference identifying a line on which an incoming call from the target party was detected.

16. The communication device of claim 14, wherein the processor is further configured to:
before detecting initiation of an outgoing call from a communication device to a target party, associate a particular one of the at least two lines with the target party in response to the receipt of an incoming call from the target party on the particular one of the at least two lines,
wherein the determining which of the at least two lines is associated with the target party is based on a preference including the association between the particular one of the at least two lines and the target party, the preference identifying a line on which the incoming call from the target party was detected.

17. The communication device of claim 14, wherein the incoming call comprises a missed incoming call on the particular one of the at least two lines from the target party.

18. A non-transitory machine readable medium containing machine-executable instructions that, when performed by a processor of a communication device having at least two lines, cause the processor to:
detect input to initiate an outgoing call from a communication device to a target party, the communication device having at least two lines;
in response to detection of input to initiate the outgoing call,
identify the target party in contact information stored on the communication device;
determine which of the at least two lines is associated with the target party based upon information in the target party's contact information and line selection information stored on the communication device; and
operate the communication device to make the outgoing call to the target party using the associated line determined by the processor.

19. The non-transitory machine readable medium of claim 18, wherein the determining which of the at least two lines is associated with the target party is based on a preference including an association between a particular one of the at least two lines and the target party, the preference identifying a line on which an incoming call from the target party was detected.

20. The non-transitory machine readable medium of claim 18, wherein the machine-executable instructions, when performed by the processor of the communication device having at least two lines, cause the processor to:
- before detecting initiation of an outgoing call from a communication device to a target party, associate a particular one of the at least two lines with the target party in response to the receipt of an incoming call from the target party on the particular one of the at least two lines,
- wherein the determining which of the at least two lines is associated with the target party is based on a preference including the association between the particular one of the at least two lines and the target party, the preference identifying a line on which the incoming call from the target party was detected.

* * * * *